(No Model.)
D. W. GOODELL.
DEVICE FOR CONTROLLING THE DRIVING WHEELS OF SEWING MACHINES.
No. 354,055. Patented Dec. 7, 1886.
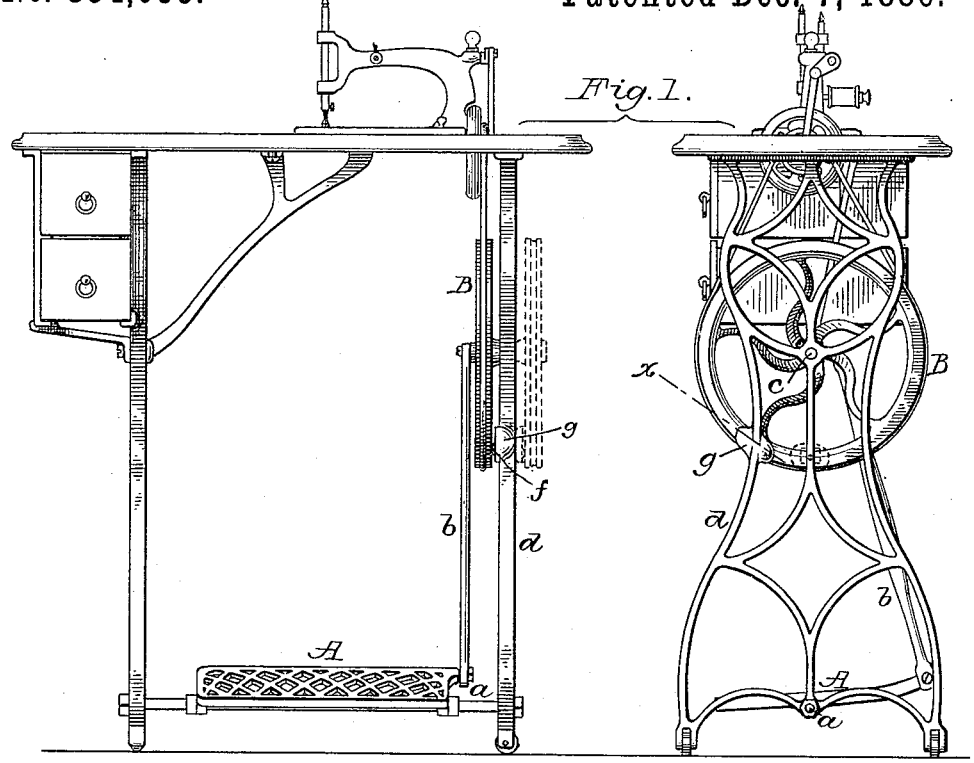
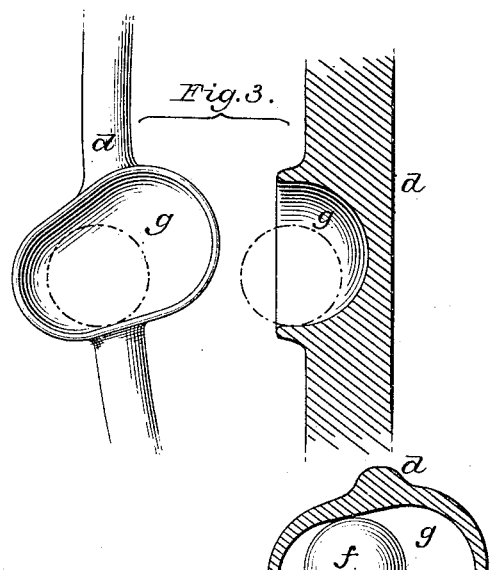
Attest:
Philip F. Larner
Howell Battle
Inventor:
Dexter W. Goodell,
By Wm. C. Wood
Attorney.

United States Patent Office.

DEXTER W. GOODELL, OF FLORENCE, MASSACHUSETTS, ASSIGNOR TO THE FLORENCE MACHINE COMPANY, OF SAME PLACE.

DEVICE FOR CONTROLLING THE DRIVING-WHEELS OF SEWING-MACHINES.

SPECIFICATION forming part of Letters Patent No. 354,055, dated December 7, 1886.

Application filed February 3, 1886. Serial No. 190,699. (No model.)

*To all whom it may concern:*

Be it known that I, DEXTER W. GOODELL, of Florence, in the city of Northampton, county of Hampshire, and State of Massachusetts, have invented certain new and useful Improvements in Devices for Controlling the Driving-Wheels of Sewing-Machines; and I do hereby declare that the following specification, taken in connection with the drawings furnished and forming a part of the same, is a clear, true, and complete description of my invention.

My invention relates to that class of contrivances which prevent the driving-wheel from backwardly rotating. I employ a ball-chamber integral with the stand-leg, a ball, and a driving-wheel, against the side of which, near its rim, said ball engages. An integral ball-chamber has heretofore been used in connection with a ball and a wheel corrugated at its side near its rim, so as to enable it to actually engage with or grasp the ball for preventing backward movement of the wheel. A smooth-surfaced wheel has also heretofore been engaged at its side by an axially-mounted roller operating without any specially-formed chamber.

My wheel at or near its rim has no dangerous abrasive surfaces with which the ball engages, and hence it is important that the wheel be adjustably mounted with relation to the ball-pocket, because the latter is integral with the stand-leg, and hence I have mounted the driving-wheel on a longitudinally-adjustable stud, whereby the wheel may be set from time to time, so as to secure the best possible co-operative relations between said wheel, the ball-pocket, and the ball.

I am aware that driving-wheel studs have been similarly arranged to admit of longitudinal adjustment; but I have for the first time, as I believe, so combined a driving-wheel, a ball, and a ball-pocket integral with the leg of a sewing-machine table that the wheel can be adjusted by means of its stud with relation to the ball-pocket for securing the best possible results of which the intermediate ball is capable of affording, thus securing a back-motion brake of a simple, cheap, and highly effective character.

To more particularly describe my invention, I will refer to the accompanying drawings, in which—

Figure 1, in side and end views, illustrates a sewing-machine stand embodying my improvements. Fig. 2 is a lateral section of one of the stand-legs on line $x$, Fig. 1, and through the ball-pocket longitudinally. Fig. 3 is a face view of the ball-pocket, and also a vertical section thereof. Fig. 4 is a vertical central section of the driving-wheel, its stud, and a portion of the stand-leg, in which said stud is mounted.

The treadle A is mounted upon a rod, $a$, and coupled by a pitman, $b$, to the driving-wheel B, in the usual manner. The driving-wheel is mounted upon a headed stud, $c$, which is of uniform diameter, and snugly occupies a seat bored through the stand or table leg $d$, and said seat is provided with a radial tapped hole occupied by a clamping-screw, $e$, by which the stud may be firmly set in position. When thus mounted, the stud may be readily adjusted longitudinally, and the driving-wheel can be readily adjusted laterally by loosening the clamp-screw and driving the stud endwise, whether for taking up wear at the point of contact between the head of the stud and the adjacent side of the wheel-hub, or between said hub and the coincident surface of the table-leg, or for adjusting said wheel in proper relations with the ball $f$ and its pocket $g$, as will next be more fully described.

The ball-pocket $g$ is placed opposite the side of the driving-wheel, so that the ball therein will bear against the coincident side of the wheel, on which a smooth or, if need be, a slightly-roughened surface is provided for an effective engagement by the ball. It is of course immaterial at what portion of said wheel, outside of its hub, this ball engaging surface is located, so long as it is circular in outline; but it is obviously desirable that it be located as near the periphery as possible, and hence I rely upon the flat side $h$ of the rim of said wheel. The ball-pocket must of necessity have an inclined interior bearing for the ball, so that when said ball is rolled downward in its pocket by the wheel it will serve as a wedge, and also so that it will run free when rolled upward. Said pocket is integral with the cast-metal table-leg, and it is possible, as shown, to provide an ample pocket without increasing the weight of the leg, inasmuch as a mere distribution of metal need only be involved; or, in other words, the metal which would otherwise need to be embodied in some one or more of the webs of the leg is merely displaced to afford the pocket, and this, too, without weakening the leg at the pocket.

It will now be seen that with the integral ball-pocket the driving-wheel can only be mounted in position after the ball has been put into its pocket, and that then said wheel must be properly adjusted laterally with relation to said ball, and in this connection the straight wheel-stud, with its capacity for endwise adjustment, has its special value.

It will be seen, if the driving-wheel were located outside of the table-leg, as indicated in dotted lines in Fig. 1, that the ball-pocket could then be located at the outer side of the table-leg without affecting the results desired, and thus place the table-leg between the driving-wheel and the clothing of the operator, and enable the pitman to be also placed outside the leg by means of a proper lateral extension of the treadle.

Having thus described my invention, I claim as new and desire to secure by Letters Patent—

The combination, substantially as hereinbefore described, of a sewing-machine-table leg having the ball-pocket integral with said leg at one side thereof, a ball in said pocket, a driving-wheel opposite said pocket and engaged at its side by said ball, and a longitudinally-adjustable driving-wheel stud, as and for the purposes specified.

DEXTER W. GOODELL.

Witnesses:
H. K. PARSONS,
OSCAR N. KYLE.